Jan. 2, 1962 W. I. NEU 3,015,803
PNEUMATIC TIRE TEMPERATURE WARNING DEVICE
Filed Aug. 22, 1958 2 Sheets-Sheet 1

INVENTOR
Wallace I. Neu
By John C. Black
Attorney.

INVENTOR
Wallace I. Neu

By John C. Black
Attorney

United States Patent Office 3,015,803
Patented Jan. 2, 1962

3,015,803
PNEUMATIC TIRE TEMPERATURE
WARNING DEVICE
Wallace I. Neu, 101 N. 14th St., Alpine, Tex.
Filed Aug. 22, 1958, Ser. No. 756,586
6 Claims. (Cl. 340—58)

The present invention relates generally to devices for giving a warning or indication when a pneumatic vehicle tire is endangered incident to underinflation, and more particularly to an improved tire temperature sensing and indicating system to provide such warning or indication.

It is well known that a pneumatic tire on a truck or other heavy duty vehicle will be damaged beyond repair within a short time interval of use if it is underinflated. This is an especially serious problem for the trucking industry in certain areas such as the Southwest section of the United States, primarily because the cost of the tires is high, for example one hundred dollars each. In some instances, the losses run as high as one tire per truck per year. Hence, a means for advising a vehicle operator of an underinflated condition of a tire can be advantageously used to reduce the losses. Upon the detection of the underinflated condition, the vehicle can be stopped prior to damage to the tire. The condition may then be corrected or the tire changed.

Several solutions to provide a satisfactory warning system have been suggested. These past attempts to solve the problem have been characterized for the most part by tire pressure responsive devices which in turn operate any one of a number of warning devices—audible, visual, and in one instance a radio transmitter and receiver. In spite of the losses encountered by the trucking industry, none of these solutions has proved to be commercially acceptable for many reasons.

It is proposed herein to provide an improved temperature sensing and indicating system for advising a vehicle operator of the properly inflated or underinflated condition of each of the vehicle tires. The degree of inflation of a vehicle tire is measured in terms of tire temperature during vehicle operation. As the tire pressure becomes unduly low, the tire temperature will rise, often rapidly, during vehicle use. Thus tire temperature rather than pressure may be sensed to prevent irreparable damage to tires. In fact, it has been noted by the applicant that the ultimate destruction of a tire is due to excessive temperature which breaks down the tire material. Hence, sensing the tire temperature rather than pressure is a more reliable method for preventing tire damage.

Accordingly, it is an object of the present invention to provide an improved means for giving a warning or indication in the event that a pneumatic tire is in danger of damage due to overheating caused by underinflation, which means are characterized by simple low cost components readily adapted for mass production techniques.

Another object is the provision of the means of the type described in the preceding object which senses and indicates relative tire temperatures. This object is accomplished by providing an electrical device sensitive to infra-red radiation from a respective tire and controlling a respective bimetal gage. The gages are located adjacent each other, preferably in a common case, to indicate the relative temperatures of their respective tires.

Another object of the invention is the provision of an ambient temperature compensated and voltage compensated system.

Another object of the invention is the provision of a system which checks itself for faults and which provides a simplified method for checking relative and absolute tire temperatures.

A feature of the invention is the provision of a tire temperature sensing apparatus comprising an infra-red radiation sensitive electrical device preferably mounted in an evacuated case having an internal surface reflecting and focusing received radiation upon the device.

Other objects and features will be evident upon a perusal of the following description taken with the accompanying drawings in which.

Figure 5:
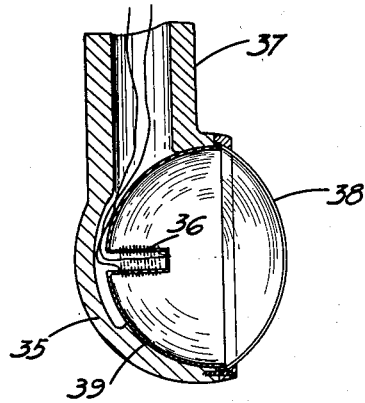
Figure 6:
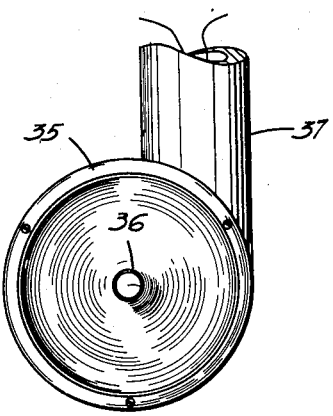
Figure 4A:
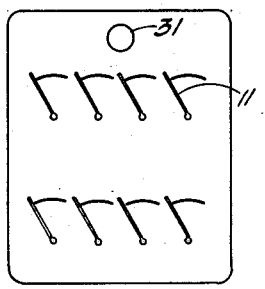
Figure 4B:
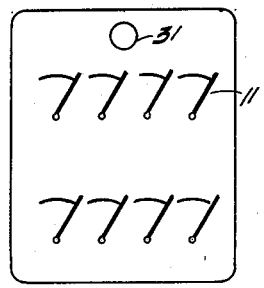
Figure 4C:
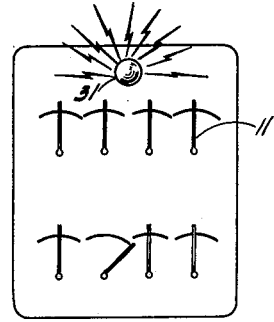

FIGS. 4A, 4B, and 4C show the gage panel diagrammatically under differing conditions;

FIG. 5 is a side elevation view in section of one form of temperature sensing device;

FIG. 6 is a front elevation view of the device of FIG. 5; and

Figure 7:
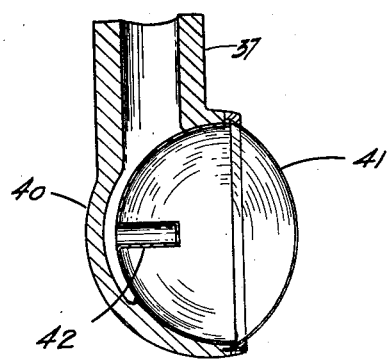

FIG. 7 is a sectional elevation view of another form of temperature sensing device.

Figure 3:
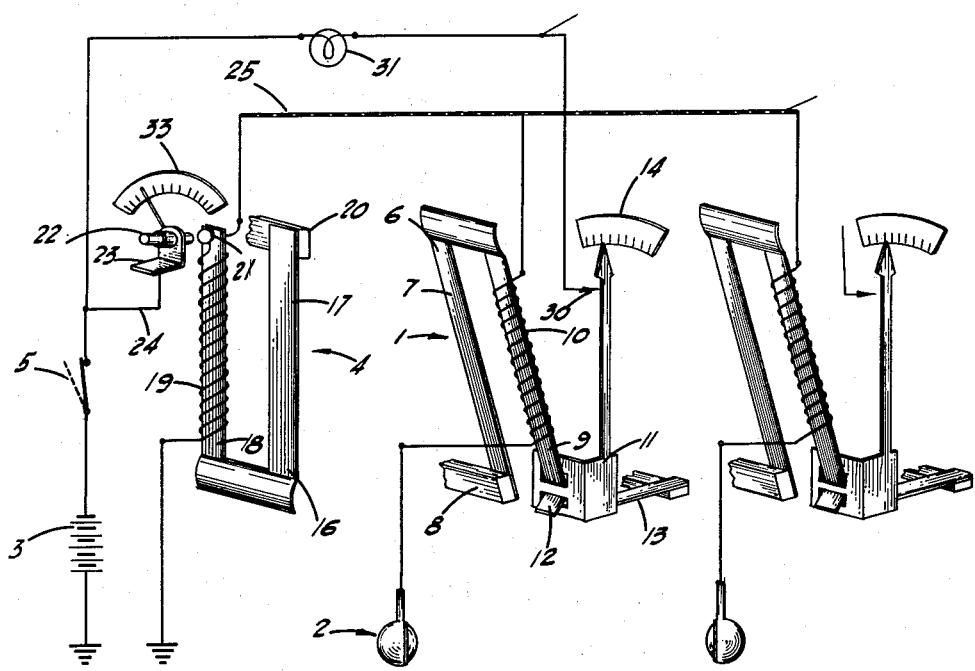
FIG. 3 is a schematic diagram of the circuit incorporated in the invention.

With particular reference to FIG. 3 it can be seen that the invention of the present application includes a plurality of gages 1, one for each tire, and a plurality of tire temperature sensing devices 2 connected in series circuit relation with respective gages 1. The gages are connected in parallel to a power source by way of a voltage and ambient temperature compensation device 4, the function of which will be described in detail later.

The power source 3 is preferably the vehicle ignition system. A switch 5 connects the source 3 to the gages 1. Preferably, switch 5 is the vehicle ignition switch.

Each gage 1 may be of a well known thermal type. Thus gage 1 includes a bimetallic U-shaped thermo-responsive element 6 comprising an ambient temperature compensating leg 7 secured to a support 8 and a leg 9 which is adapted to be heated by a heating element 10. As the leg 9 is heated, it moves a pointer 11 pivotally supported in the free end 12 of the leg 9. A biasing spring 13 is provided for the pointer 11. A scale 14 cooperates with the pointer 11 to provide readings.

The reading of the gage 1 will of course depend upon and vary with the intensity of the current flowing through the heating element 10.

The device 4 is generally similar to the gage 1, comprising a thermo-responsive element 16 with an ambient temperature compensating leg 17 and a control leg 18 heated by an element 19. A stationary support 20 is provided at the upper end of the leg 17.

The heating element 19 is connected electrically to the upper end of leg 18 and to ground. A contact 21 is carried at the upper end of the leg 18 and is engageable with an adjustable screw 22 carried by a fixed support 23.

When the leg 18 is below a certain temperature the contact 21 engages contact screw 22 to complete a circuit from the voltage source 3 to the heating element 19 and to the gages 1 and temperature sensing devices 2 by way of conductor 24, support 23, screw 22, contact 21 and conductor 25.

The heating element 19 heats the leg 18 until it flexes sufficiently to separate the contact 21 from the screw 22 to break the circuit. Soon thereafter, the leg 18 will cool sufficiently to cause the contact 21 to engage the screw 22 to re-establish the circuit. In this way, the device 4 acts as a true voltage regulator, the regulated voltage depending upon the amount of energy required to separate contact 21 from screw 22. This in turn depends upon the initial pressure applied to the yieldable leg 18 by the setting of the adjustable screw 22.

However, the device 4 without further modification acts in a dual capacity as a means for compensating for the effect of ambient temperature on tire temperature.

Once the screw 22 is set the average voltage (or energy) to the gages will not vary. However, the setting may be varied in accordance with the ambient temperature to apply a higher or lower average voltage depending upon whether the ambient temperature is causing the gages to read low or high respectively.

For example, assume that device 2 changes a resistor in series with gage 1 to increase in resistance as the tire temperature increases. As a result, the gage pointer 11 will move due to less flexing of the bimetal leg 9. When this increase in resistance is due solely to the difference in ambient temperature on hot and cold days and its effect on tire temperature, this may be compensated for by increasing the voltage applied to the gages. Thus, the pointer may be made to assume a single "normal" position for differing ambient conditions. In this regard scales 14 and 33 are provided for the gages 1 and device 4 respectively.

However, the device 4 provides further additional and/or alternative features. When each gage 1 is provided with a fixed contact 30, shown diagrammatically to engage the pointer in a predetermined position thereof, for operating a warning lamp 31, a simple adjustment procedure is achieved. The contact 30 is adapted to engage the pointer in a position of the pointer corresponding to a predetermined cool condition of the bimetal leg 9. This condition will correspond to a dangerously hot tire condition and an alarm will be given when the contact engages the pointer. However it will also correspond to or be a condition of higher leg temperature than the leg condition when the truck is started. Under this condition, an alarm is given for each tire on truck starting, whereby the circuit is self checking for faults. The alarm will soon disappear as tire bimetal leg 9 is heated by the element 10.

After the gage bimetals are heated and after the truck is in operation a sufficient time to produce normal tire heating, the setting of the screw 22 may be varied to provide an average voltage which will cause all alarms to operate. Then the setting may be backed off a predetermined degree beyond that necessary to extinguish the alarms. The new setting will be indicative of a dangerous tire condition if any one alarm is subsequently operated. During the backing off procedure, the relative temperature conditions of the tires may be noted by observing the sequence in which the alarm lamps 31 extinguish.

Figure 1:
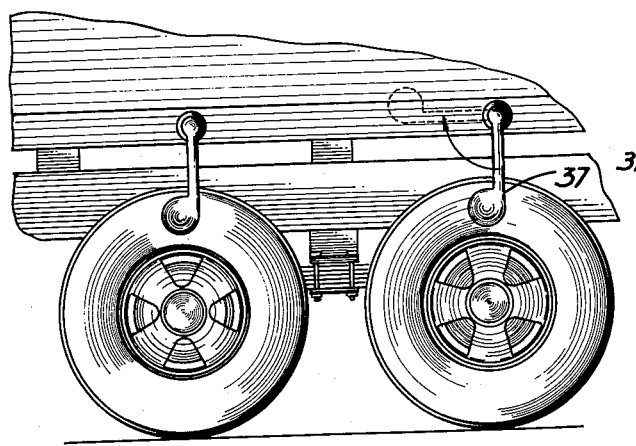
FIG. 1 is a side elevation view of a truck equipped with the invention.
Figure 2:
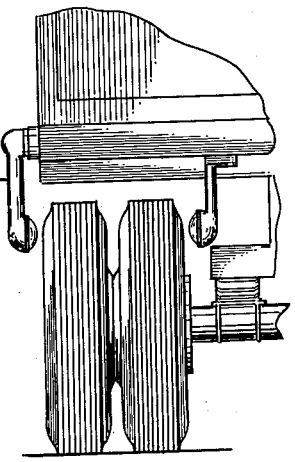
FIG. 2 is a partial rear view of the truck.

One form which the temperature sensing devices 2 may take is shown in FIGS. 5 and 6. A case 35 generally similar to but smaller than evacuated sealed beam lights carries centrally therein an electrical resistance wire 36 with a high temperature coefficient. Thus as the temperature of wire 36 rises so does its resistance. The wire 36 is connected in series circuit relation with the heating element 10 of gage 1 and the source 3 to vary the current flowing through element 10 in accordance with the temperature of wire 36. The inside of the case 35 is preferably silvered at 39 an dshaped to concentrate all received radiation on the wire 36. The case 36 is carried by a pivoted arm 37 on the truck in a position whereby it focuses radiated infra-red rays from the truck tire on the wire 36. The glass 38 is transparent at least to infrared radiation. The arm may be swung to a second position shown in broken lines in FIG. 1 when a tire is being changed.

FIG. 7 shows an alternative construction for the temperature sensing device 2. The case 40 encloses a photocell, e.g. a barrier photocell, and the glass 41 is opaque to all except infra-red radiation. Suitable amplification may be provided where required.

Gages other than the bimetallic type may be used in some instances.

While there has been described what is believed at present to be the preferred embodiment of the invention, other changes and modifications may be made therein; and, it is contemplated to cover in the appended claims all such changes and modifications as fall within the true spirit and scope of the invention.

What is claimed is:

1. In a system for apprising a vehicle operator of an underinflation condition in one of the pneumatic vehicle tires which causes a rise in the tire temperature, wherein there is a bimetallic gage for indicating the tire temperature and an electrical circuit connected to and energizing the gage, the combination with the vehicle tire and said electrical circuit of an electrical temperature responsive device carried by the vehicle in close proximity to and exposed to radiation from the tire and connected into the circuit to change the current flowing through the gage in accordance with tire temperature.

2. In a system for apprising a vehicle operator of an underinflation condition in one or more of the pneumatic vehicle tires which causes a rise in the temperature of the uninflated tire, wherein there is a plurality of bimetallic gages each having a pointer for indicating the temperature of a respective tire and an electrical circuit connected to and energizing the gages, the combination with the vehicle tires and said electrical circuit of a plurality of electrical temperature responsive devices carried by the vehicle with each positioned in close proximity to a respective tire and exposed to radiation from the respective tire, said devices being connected into said electrical circuit to change the current flowing through respective gages in accordance with the temperatures of the respective tires.

3. The combination set forth in claim 2, including means mounting the gage pointers adjacent each other to indicate the relative temperatures of the tires substantially independently of ambient temperature.

4. The combination set forth in claim 2, including manually adjusted means connected to said electrical circuit for raising or lowering the effective current through said gages and said sensing devices to move the pointers to desired normal inflation indicating positions independent of the effects of ambient temperature on the tires.

5. In combination with an inflatable vehicle tire mounted in running position on a vehicle, an electrical temperature responsive device carried by the vehicle in close proximity to and exposed to radiation from the tire, an electrically operated gage for indicating tire temperature, and an electrical circuit including energizing means connected to said temperature responsive device and said gage so that said gage indicates current flow changes at said temperature responsive device in accordance with changes in tire temperature.

6. In a system for apprising a vehicle operator of an underinflation condition in one of the pneumatic vehicle tires which causes a rise in the tire temperature, wherein there is an electrically operated means for indicating the tire temperature and an electrical circuit connected to and energizing said means, the combination with the vehicle tire and said electrical circuit of means including an electrical temperature responsive device carried by the vehicle in close proximity to and exposed to heat emanating from the tire and connected into the circuit to change the current flowing through said means in accordance with tire temperature.

References Cited in the file of this patent
UNITED STATES PATENTS

| | | |
|---|---|---|
| 2,182,554 | Galle | Dec. 5, 1939 |
| 2,230,906 | Potts | Feb. 4, 1941 |
| 2,279,140 | Kellen | Apr. 7, 1942 |
| 2,550,041 | Cozzolino et al. | Apr. 24, 1951 |
| 2,553,420 | McFee | May 15, 1951 |
| 2,615,085 | Smulski | Oct. 21, 1952 |
| 2,659,070 | Gallo | Nov. 10, 1953 |
| 2,720,638 | Ritch | Oct. 11, 1955 |
| 2,727,221 | Sprigg | Dec. 13, 1955 |
| 2,818,508 | Johanson et al. | Dec. 31, 1957 |
| 2,906,885 | Orthuber et al. | Sept. 29, 1959 |
| 2,911,633 | Boddy | Nov. 3, 1959 |